United States Patent [19]
Griesmer

[11] Patent Number: 5,923,328
[45] Date of Patent: *Jul. 13, 1999

[54] METHOD AND SYSTEM FOR DISPLAYING A HIERARCHICAL SUB-TREE BY SELECTION OF A USER INTERFACE ELEMENT IN A SUB-TREE BAR CONTROL

[75] Inventor: James P. Griesmer, Seven Hills, Ohio

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/693,954

[22] Filed: Aug. 7, 1996

[51] Int. Cl.$^6$ ............................................. G06F 3/14
[52] U.S. Cl. .......................... 345/357; 345/339; 345/348
[58] Field of Search ................................. 395/357, 356, 395/326, 339, 340, 348, 352, 353, 354; 345/357, 356, 326, 339, 340, 348, 352, 353, 354

[56] References Cited

U.S. PATENT DOCUMENTS

| | | | |
|---|---|---|---|
| 4,589,063 | 5/1986 | Shah et al. ................................ | 364/200 |
| 4,649,479 | 3/1987 | Advani et al. ........................... | 364/300 |
| 5,065,347 | 11/1991 | Pajak et al. ............................ | 395/348 |
| 5,179,666 | 1/1993 | Rimmer et al. ......................... | 395/275 |
| 5,291,585 | 3/1994 | Sato et al. ............................... | 395/500 |
| 5,339,432 | 8/1994 | Crick ....................................... | 395/700 |
| 5,432,941 | 7/1995 | Crick et al. ............................. | 395/700 |
| 5,491,795 | 2/1996 | Beaudet et al. ..................... | 395/357 X |
| 5,522,025 | 5/1996 | Rosenstein ............................. | 395/158 |
| 5,644,736 | 7/1997 | Healy et al. ........................ | 395/357 X |
| 5,644,739 | 7/1997 | Moursund ............................... | 395/354 |
| 5,644,740 | 7/1997 | Kiuchi ..................................... | 395/357 |
| 5,659,791 | 8/1997 | Nakajima et al. .................. | 395/348 X |
| 5,701,137 | 12/1997 | Kiernan et al. ........................ | 345/340 |
| 5,714,971 | 2/1998 | Shalit et al. ............................ | 345/340 |

OTHER PUBLICATIONS

Cowart, "Masterin Windows 3.1", Sybex Inc., pp. 132–138, 1993.

Microsoft® Windows™ 3.1 Guide to Programming, Microsoft Press, Chapter 8, Controls, 1987–1992, pp. 165–188.

*Primary Examiner*—Matthew M. Kim
*Assistant Examiner*—Crescelle N. dela Torre
*Attorney, Agent, or Firm*—Christensen O'Connor Johnson & Kindness PLLC

[57] ABSTRACT

A sub-tree bar control is provided that aggregates a group of sub-tree view controls. The sub-tree bar control contains user interface elements that are associated with sub-tree view controls. Each sub-tree view control enables an application program to display a list of items as a hierarchical sub-tree in a window. When a user selects the user interface element associated with the node, the sub-tree view control is displayed in a window. By displaying a sub-tree view control, the user views only the information that the user is interested in viewing. Since the sub-tree view control displays only a sub-tree, instead of an entire tree, it typically takes up less display space on the video display than a control that contains an entire tree. Additionally, the sub-tree view control automatically ceases to be displayed based on certain events. The window in which the sub-tree view control is displayed can be resized, either vertically or horizontally. Nodes in the sub-tree can be expanded or contracted. Nodes in the sub-tree can also be selected as root nodes of sub-trees for new sub-tree view controls or otherwise be manipulated as the nodes in the tree displayed in the tree-view control. Moreover, the nodes that are roots of the sub-trees are displayed on the sub-tree bar control so as to provide easy selection of the sub-tree view controls.

31 Claims, 15 Drawing Sheets

METHOD AND SYSTEM FOR DISPLAYING A HIERARCHICAL SUB-TREE BY SELECTION OF A USER INTERFACE ELEMENT IN A SUB-TREE BAR CONTROL

TECHNICAL FIELD

The present invention relates generally to data processing systems and, more particularly, to enabling a display of at least one sub-tree that is associated with a sub-tree bar control and that provides a list of items ordered in a hierarchical fashion.

BACKGROUND OF THE INVENTION

In some conventional systems, a list of items, such as files in a file directory, can be displayed as a hierarchical tree within a window that has a particular width and height. Typically, when the hierarchical tree is displayed, at least one root node is displayed along with several child nodes. A root node is at the highest level of the hierarchy, and child nodes "depend from" the root node. Additionally, the nodes from which child nodes depend are known as parent nodes. Therefore, each root node that has child nodes is a parent node. Also, some nodes are child nodes that depend from a parent node and are parent nodes from which other child nodes depend. Each of the nodes in the hierarchical tree corresponds to an item in the list, and each node has a label.

In these conventional systems, the window containing the hierarchical tree sometimes is not wide enough to display a parent node and its child nodes. FIG. 1 illustrates a list of items displayed as a hierarchical tree within a window 100. This window 100 is adjacent to another window 102 that is used to display other information, such as the output of an application program. The window 100 is not wide enough to display the labels of some nodes in their entirety, such as the label "My Documents" 110 which appears as "My Docu." However, the label for the "Desktop" node 108 is displayed in its entirety. Additionally, the parent nodes of the hierarchical tree can be expanded or contracted. When a parent node is expanded, its child nodes are displayed. For example, the "Volume 1" node 120 is expanded to show its child nodes. When a parent node is contracted, its child nodes are not displayed. For instance, the "Appsetup on Main" node 122 has been contracted so that its child nodes are not shown.

When the window is not wide enough to display the labels of the nodes in their entirety, a user may scroll the tree using a horizontal scroll bar 112 to view these labels. FIG. 2 illustrates the window 100 when the horizontal scroll bar 112 has been used to scroll the tree. As the user scrolls, some nodes are scrolled out of the window, while other nodes are scrolled into the window. Therefore, scrolling may prevent the user from viewing all of the nodes the user wishes to see at the same time. For example, in FIG. 2, the label for "My Documents" node is visible, but the label for "Desktop" node 108 is only partially visible as "op." Additionally, when the window is not wide enough, a user may increase the width of the window. However, increasing the width of the window decreases the amount of display space remaining on the video display for displaying other information, such as the output of the application program in another window 102. FIG. 3 illustrates the window 100 after it has been widened. As illustrated, window 102 has decreased in size. Also, when the width of the window is increased, more information than the user is interested in viewing or more blank space within the window may be displayed. This is inefficient use of the display space on the video display.

Moreover, some conventional systems provide "title tips," which provide information about each node in the tree. However, usually, the title tips are displayed for a node only when a label associated with that node is at least partially displayed in the window.

In some cases, the window containing the hierarchical tree is not long enough to display the hierarchical tree. Then the user may scroll through the tree using a vertical scroll bar or may expand the height of the window. Sometimes, the user is interested in viewing two or more nodes at the same time that cannot be displayed in the window simultaneously, even after the window has been expanded. In this case, the user can either continually scroll the tree to view both nodes or continually expand and contract parent nodes to view the desired nodes.

SUMMARY OF THE INVENTION

In accordance with a first aspect of the present invention, a method is practiced in a data processing system having a video display and an input device. In accordance with this method, a tree view control is displayed on the video display within a first window. The tree view control provides a first list of items displayed as a hierarchical tree. In addition, a sub-tree bar control is displayed on the video display. The sub-tree bar control has at least one user interface element. In response to input from the input device, one of the items in the first list displayed in the tree view control is selected. The selected item is associated with a user interface element of the sub-tree bar control. Next, a sub-tree view control is generated. The sub-tree view control provides a second list of items displayed as a hierarchical sub-tree that includes the selected item. In response to input from the input device selecting the user interface element, the generated sub-tree view control is displayed on the video display within a second window, whereby the second list of items provided by the sub-tree view control is displayed.

In accordance with a second aspect of the present invention, a method for displaying a list of items is practiced in a data processing system having a video display and an input device. In accordance with this method, a tree view control is displayed on the video display within a window. The tree view control provides a first list of items displayed as a hierarchical tree. A sub-tree bar control is also displayed on the video display and has at least one user interface element. One of the items in the first list is selected. The selected item is a root for a portion of the hierarchical tree. The selected item is dragged to a user interface element on the sub-tree bar control. Then the selected item is dropped onto the user interface element, thereby creating an association between the selected item and the user interface element. Once the association is created, when the user interface element is selected, a sub-tree view control with the selected item as a root is displayed.

In accordance with an additional aspect of the present invention, a method for displaying a list of items is practiced in a data processing system having a video display and an input device. A sub-tree bar control is displayed on the video display having at least one user interface element that is associated with a sub-tree view control. The sub-tree view control provides a list of items displayed as a hierarchical sub-ree. In response to input from the input device, the user interface element is selected. Then a sub-tree view control that is associated with the selected user interface element is displayed on the video display within a window.

In accordance with another aspect of the present invention, a method for displaying a list of items is practiced in a data processing system having an application program, a video display, and an input device. A sub-tree bar control is provided that has at least one user interface element. Each user interface element is associated with a sub-tree bar control that may be used by the application program to display a list of items as a hierarchical sub-tree in a sub-tree view control on the video display. Then, the provided sub-tree bar control is used by the application program to display on the video display the sub-tree view control associated with the user interface element, whereby the list of items is displayed.

In accordance with yet another aspect of the present invention, a method for displaying a list of items is practiced in a data processing system having a client application program, a server application program, a video display and an input device. Under control of the server application program, a sub-tree bar control is provided having at least one user interface element. Each user interface element is associated with a sub-tree view control that may be used by the application program to display a list of items as a hierarchical sub-tree on the video display. Under control of the client application program, the sub-tree bar control provided by the server application program is displayed on the video display and the hierarchical sub-tree is populated with the list of items. Then, under control of the server application program, in response to input from the input device selecting the user interface element, the sub-tree view control is displayed on the video display within a window.

In accordance with a further aspect of the present invention, a data processing system includes a video display and an input device. The data processing system also includes a first displayor for displaying on the video display a tree view control within a first window. The tree view control provides a list of items displayed as a hierarchical tree. The data processing system also includes a second displayor for displaying on the video display a sub-tree bar control having at least one user interface element. A selector is included for selecting one of the items in the first list in response to input from the input device selecting an item. The data processing system also includes an associator for associating the selected item with the user interface element of the sub-tree bar control. Moreover, a generator is included for generating a sub-tree view control. The sub-tree view control provides a list of items displayed as a hierarchical sub-tree with the selected item being a root of the hierarchical sub-tree. Also a third displayor is included for displaying on the video display the generated sub-tree view control within a second window.

In accordance with an additional aspect of the present invention, a data processing system includes a video display and an input device. The data processing system also includes a first displayor for displaying on the video display a sub-tree bar control having at least one user interface element that is associated with a sub-tree view control. Each sub-tree view control provides a list of items displayed as a hierarchical sub-tree. A selector is included for selecting a user interface element in response to input from the input device selecting the user interface element. Moreover, a second displayor is included for displaying on the video display a sub-tree view control associated with the selected user interface element within a window.

In accordance with another aspect of the present invention, a computer-readable storage medium contains computer instructions, which, when executed by a computer system, perform the steps discussed below. The computer instructions perform the step of displaying a tree view control on a video display within a first window. The tree view control provides a first list of items displayed as a hierarchical tree. The computer instructions also perform the step of displaying on the video display a sub-tree bar control having at least one user interface element. Moreover, the computer instructions perform the step of selecting an item on the first list in response to input from the input device. Then, the computer instructions perform the step of associating the selected item with the user interface element of the sub-tree bar control. Next, the computer instructions perform the step of generating a sub-tree view control. The sub-tree view control provides a second list of items displayed as a hierarchical sub-tree with the associated item being a root of the hierarchical sub-tree. In response to input from the input device selecting the user interface element, the computer instructions perform the step of displaying the generated sub-tree view control on the video display within a second window.

In accordance with a further aspect of the present invention, a computer-readable storage medium contains computer instructions, which, when executed by a computer system, perform the steps discussed below. The computer instructions perform the step of displaying on a video display a sub-tree bar control having at least one user interface element that is associated with a sub-tree view control. Each sub-tree view control provides a list of items displayed as a hierarchical sub-tree. The computer instructions also perform the step of selecting a user interface element in response to input from the input device. Then, the computer instructions perform the step of displaying on the video display a sub-tree view control associated with the selected user interface element within a window.

DETAILED DESCRIPTION OF THE INVENTION

Figure 1:
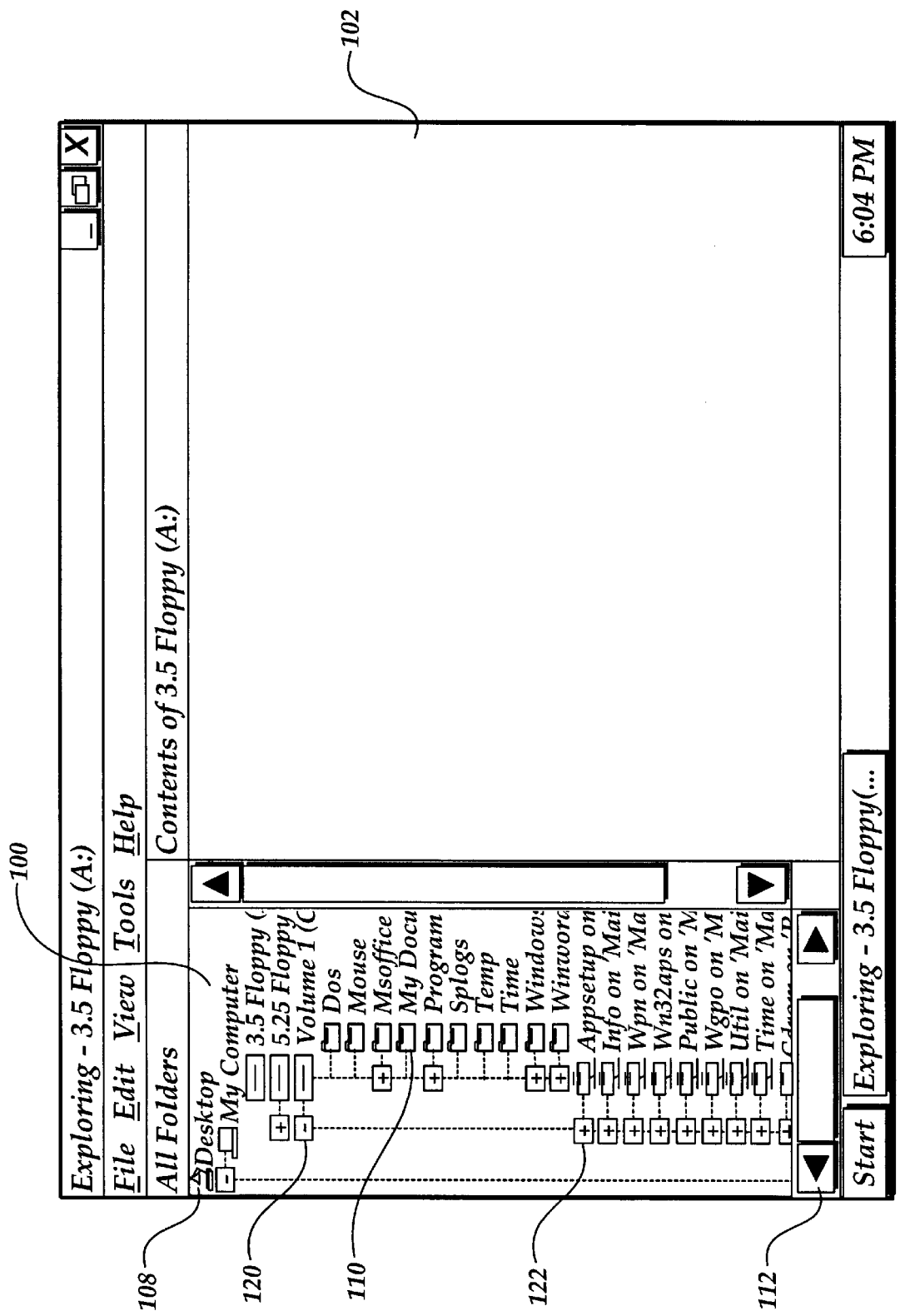
FIG. 1 illustrates a list of items displayed as a hierarchical tree within a window.
Figure 2:
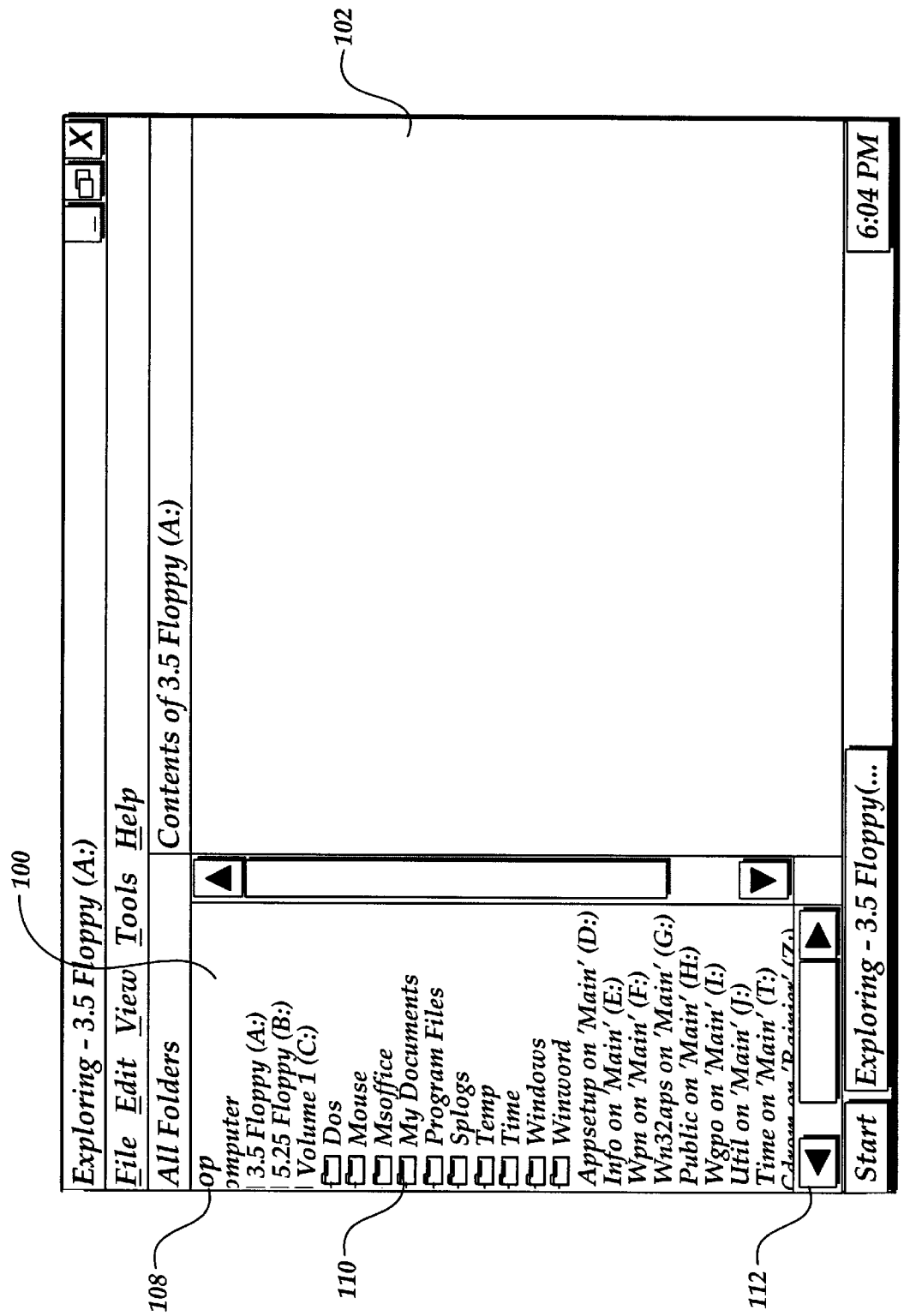
FIG. 2 illustrates a window when a horizontal scroll bar has been used to view a list of items.
Figure 3:
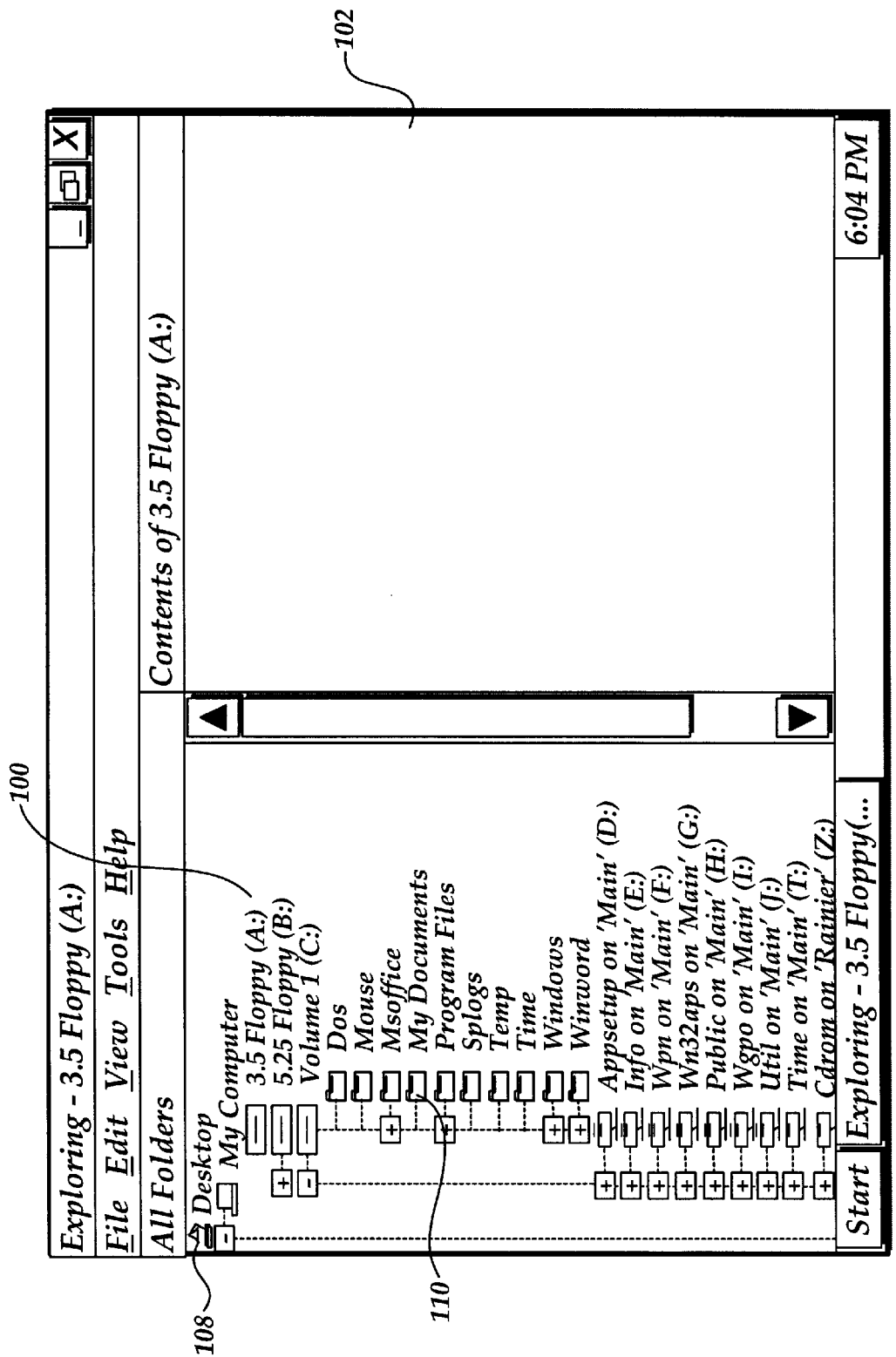
FIG. 3 illustrates a window after the width of the window has been increased.

The preferred embodiment of the present invention provides a sub-tree bar control that aggregates a group of sub-tree view controls. The sub-tree bar control contains user interface elements that are associated with the sub-tree view controls. Each sub-tree view control is a tree view control that displays a list of items as a hierarchical sub-tree in a window. A tree view control enables application programs to display a hierarchical list of items in a window. The tree view control is a child window control that is available for application programs to use and eliminates the need to provide customized code to display data items in a hierarchical fashion. In particular, when a user selects a node in the tree of the tree view control that the user wishes to expand and view, the selected node is associated with a user interface element of the sub-tree bar control. Next, a sub-tree view control associated with the selected user interface element is generated. That is, the sub-tree view control is populated with a sub-tree containing the selected node and its children, with the selected node being a root. When a user selects the user interface element associated with the node, the generated sub-tree view control is displayed in a window.

Therefore, when a user is interested in viewing a node of a tree and its children, a sub-tree view control having that node as its root node can be generated. By displaying this sub-tree view control, the user views only the information that the user is interested in viewing. Since the sub-tree view control displays only a sub-tree, instead of an entire tree, it typically takes up less display space on the video display than a tree view control, which contains an entire tree. Additionally, the sub-tree view control automatically ceases to be displayed based on certain events (e.g., selection of another user interface element). The sub-tree view control, however, has the same functionality as a tree view control of the application program. Therefore, the window in which the sub-tree view control is displayed can be resized, either vertically or horizontally. Nodes in the sub-tree can be expanded or contracted. Nodes in the sub-tree can also be selected as root nodes of sub-trees for new sub-tree view controls and can be manipulated in the same manner as nodes in the tree displayed in the tree-view control. Moreover, the nodes that are roots of the sub-trees are displayed on the sub-tree bar control so as to provide easy selection of the sub-tree view controls.

A control is a user interface element that can be manipulated by a user to perform an action. Typically, the control is used to receive user input, such as mouse and keyboard input. For example, a child window control is a child window that typically resides within a parent window. When user input is received in a child window, the child window sends the input to the parent window. One of the primary uses of child window controls is to process mouse and keyboard messages so that the child window acts as a kind of input device for the parent window. Other controls include tree view controls, sub-tree view controls, and sub-tree bar controls. One skilled in the art would recognize that yet other controls can be used, including a single control that encompasses a tree view control and a sub-tree bar control.

Figure 4:
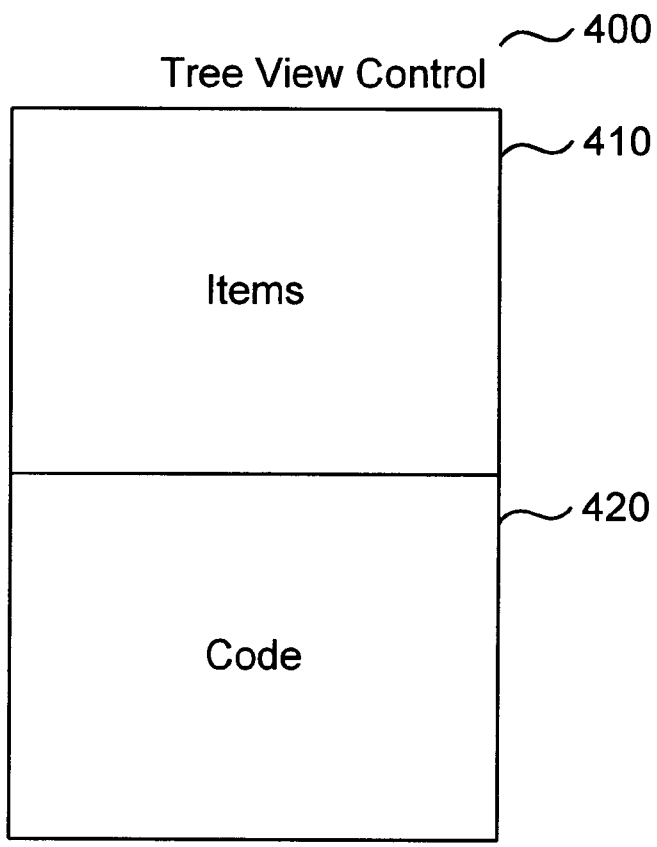
FIG. 4 illustrates one example of a tree view control from a programming perspective.

A tree view control is one type of control. In particular, a tree view control is a child window control. As shown in FIG. 4, from a programming perspective, a tree view control 400 may be viewed as including a list of items 410 and code 420 for displaying and manipulating the items 410.

Figure 5:
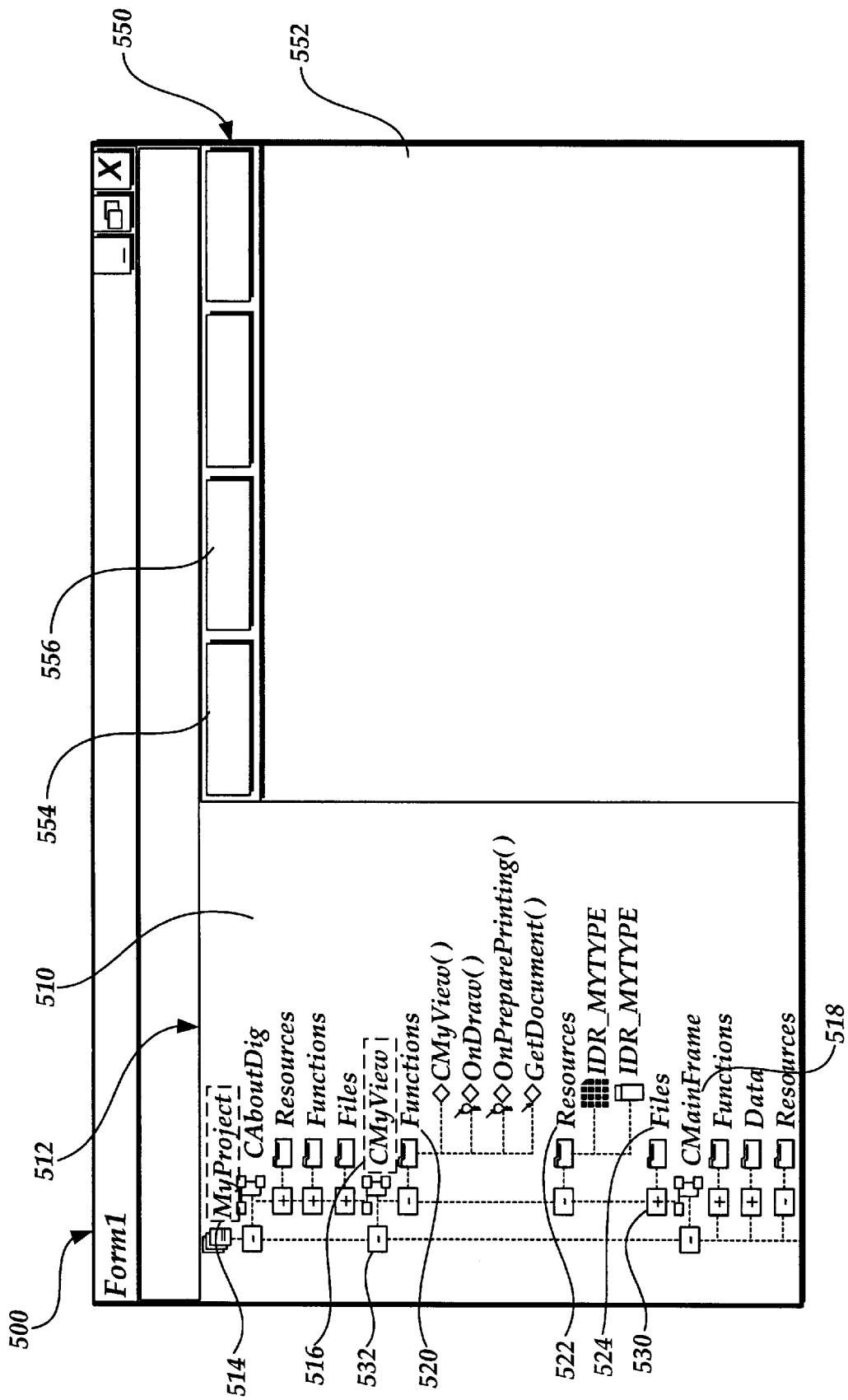
FIG. 5 illustrates one example of a tree view control as it would appear on a video display.

FIG. 5 illustrates one example of a tree view control 510. The tree view control enables programs to display a list of items as a hierarchical tree in a window. In particular, the tree view control is displayed as a window 512 within a parent window 500. The window 512 holds a list of items that are organized as a hierarchical tree. The root node of the tree shown in FIG. 5 is the "MyProject" node 514. Child nodes of the root node include "CMyView" 516 and "CMainFrame" 518. As illustrated in FIG. 5, some of the child nodes of the node "CMainFrame" 518 are not displayed on the video display due to limited space in the tree view control. Additionally, the tree view control provides the ability to expand or contract the tree of items that is shown to a user. When a node is expanded, its child nodes are displayed. When a node is contracted, its child nodes are not displayed. This mechanism for expanding or contracting the tree is independent of a currently selected item in the tree. For instance, the "CMyView" node 516 has been expanded to show its child nodes "Functions" 520, "Resources" 522, and "Folders" 524. A node is expanded by selecting the expansion indicator "+" 530. Moreover, the node "Folders" 524 has been contracted so that its child nodes are not shown. A node is contracted by selecting the contraction indicator "−" 532. In addition, labels are associated with items in the tree and may be edited in place. For example, the name of a node, such as "CMyView," is a label that can be edited.

Figure 6:
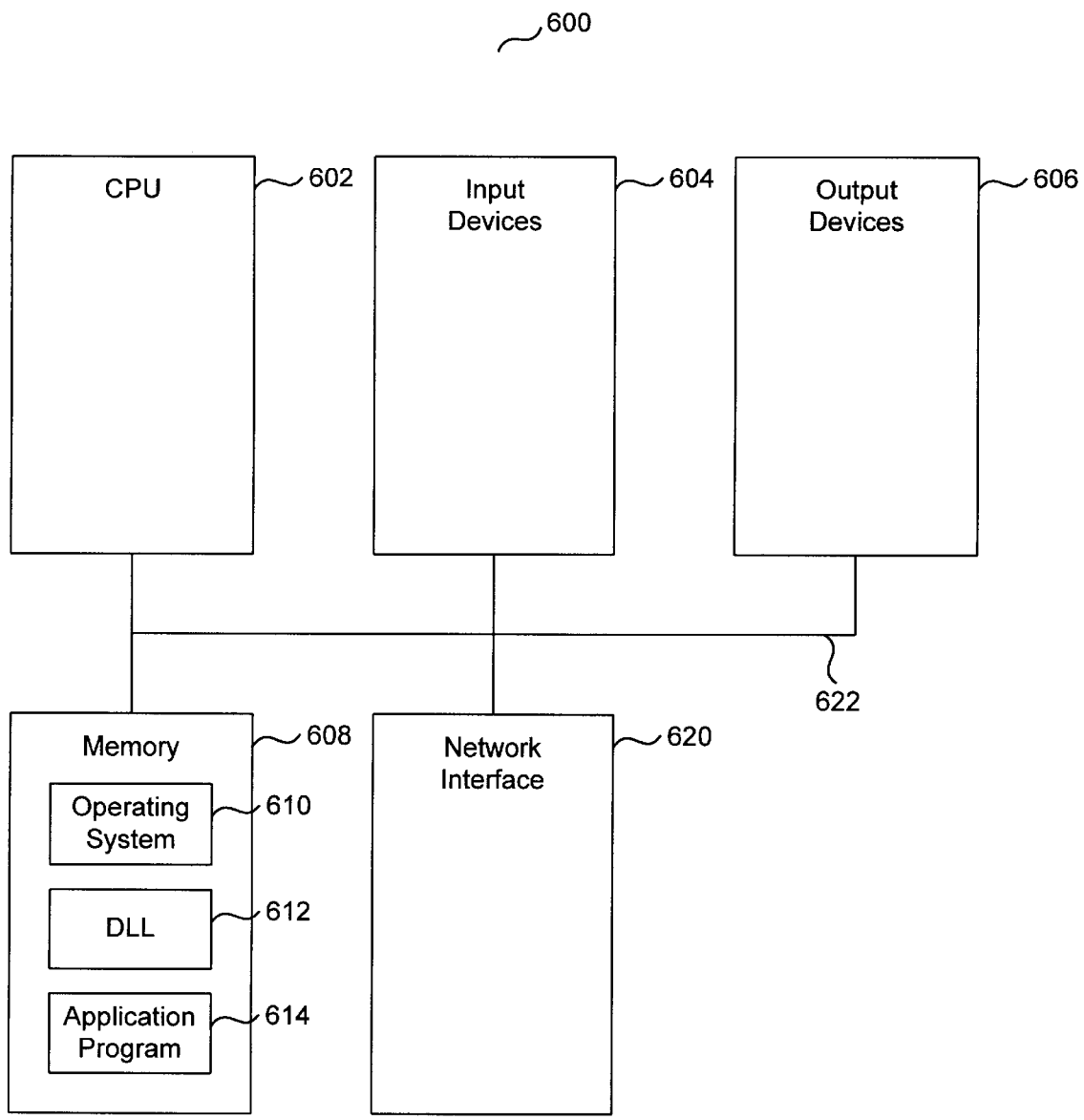
FIG. 6 is a block diagram of a data processing system that is suitable for practicing the preferred embodiment of the present invention.

FIG. 6 is a block diagram of a data processing system that is suitable for practicing the preferred embodiment of the present invention. The data processing system 600 includes a CPU 602 that is connected to input devices 604, such as a mouse or a keyboard, and output devices 606, such as a video display. The data processing system also includes a network interface 620 for interfacing the data processing system with the network. Memory 608 stores data and code. Specifically, memory 608 holds a copy of an operating system 610. For purposes of discussion below, the operating system 610 is the MICROSOFT WINDOWS 95 operating system from Microsoft Corporation of Redmond, Wash. The operating system also includes a dynamic link library (DLL) that contains code structures and messages for implementing the sub-tree view control and the sub-tree bar control. The DLL may also include code for implementing additional controls. The memory also includes an application program 614. Those skilled in the art will appreciate that the present invention need not be implemented through a DLL and also need not be implemented as part of an operating system, but rather may be implemented as a separate system resource. A connecting mechanism 622, such as a bus, connects the components of the computer system.

Figure 7:
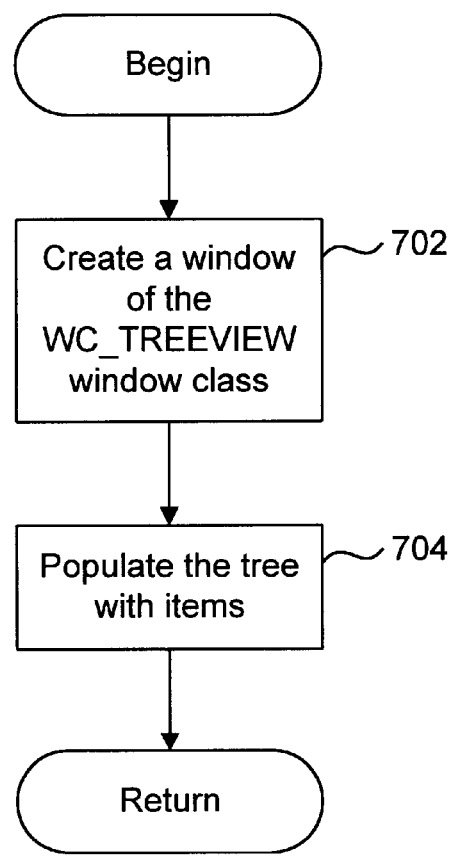
FIG. 7 illustrates the steps performed to create a tree view control.

Each window displayed on a video display 604 has an associated window procedure that processes messages that are destined for the window. The operating system 610 supports the notion of a window class that identifies the window procedure for processing messages for a window of that class. Each control is defined by a window class, and different controls are of different window classes. The operating system 610 defines a special window class, WC_TREEVIEW, for tree view controls. In order to create a tree view control like that shown in FIG. 5, a programmer follows the steps shown in the flowchart of FIG. 7. In particular, a programmer creates a window of the WC_TREEVIEW window class by calling the CreateWindowEx( ) function that is provided by the operating system 610 (step 702 in FIG. 7). The CreateWindowEx( ) function is defined as part of the MICROSOFT WIN32 API to be a function that creates windows with an extended style. The tree of items to be displayed by the tree view control must then be populated (step 704 in FIG. 7). In other words, items must be added to the tree view control so that they are properly added as part of the tree of items displayed by the tree view control. Items are added, removed, and otherwise manipulated by sending messages to the tree view control.

The hierarchical trees displayed by the tree view control and the sub-tree view control are displayed in windows, which application programs generate. In particular, the operating system 610 maintains a message queue for each application program 614 that generates windows. Accordingly each application program has its own message queue. Moreover, each window has a separate window procedure associated with it. When an input event occurs, the operating system 610 translates the input event into a message that is put into the message queue for the application program. An input event corresponds to the actions of a user. For example, an input event may indicate movement of a mouse 604, may indicate the position of a mouse cursor 604, or may indicate a keystroke received from a keyboard 604. Once a message is queued for an application program 614, the application program retrieves and delivers the message to the proper window procedure. The window procedure that receives the message processes the message. In this manner, user input selecting a node in a tree is received as an input event, translated to a message, and processed by the appropriate window procedure.

A sub-tree bar control is another type of control. The sub-tree bar control has a series of user interface elements, such as buttons. One skilled in the art would recognize that the sub-tree bar control could contain other user interface elements, such as icons or windows. Each of the buttons has an associated "empty" sub-tree view control. The sub-tree view control is said to be empty when it has not been populated with a list of items. FIG. 5 illustrates an "empty" sub-tree bar control 550. The sub-tree bar control 550 is a window 552 containing four buttons, such as button 554. The sub-tree bar control is said to be "empty" as no nodes have been associated with the buttons.

When a user selects a node in the tree displayed in the tree view control and drops it onto the button, the sub-tree bar control populates the empty sub-tree view control by obtaining the sub-tree for the selected node from the tree view control. A user selects a node by pointing at it with an input device, such as a mouse, and identifying the node by depressing an indicator, such as a mouse button.

Figure 8A:
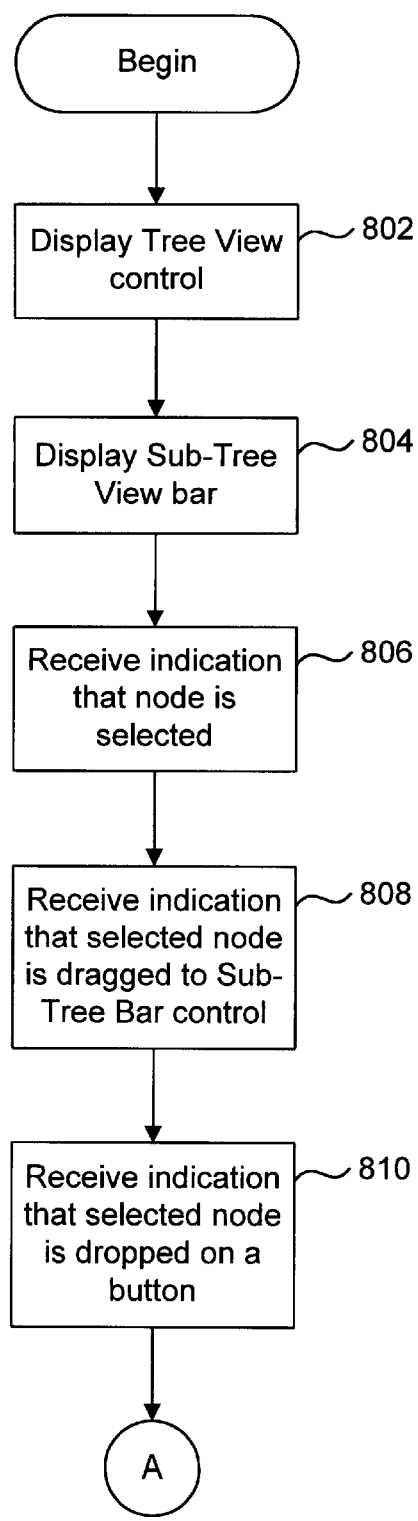
FIGS. 8A and 8B illustrate the steps performed to associate a ode of a tree in a tree view control with a button of a sub-tree bar control.
Figure 8B:
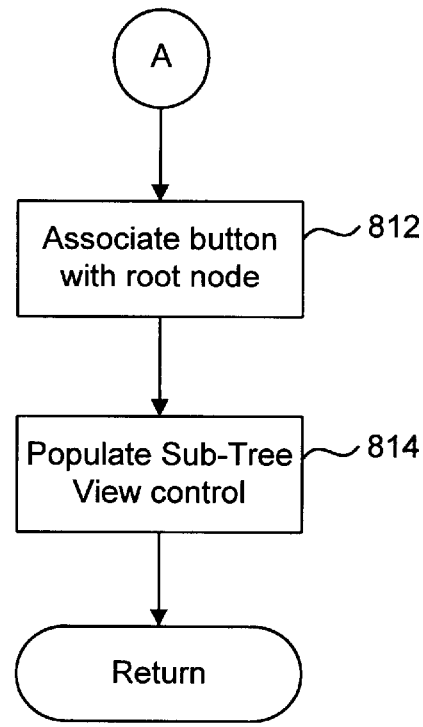

FIGS. 8A and 8B illustrate the steps performed to associate a node of a tree in a tree view control with a button of a sub-tree bar control. Initially, a tree view control is displayed (step 802). Additionally, a sub-tree bar control is displayed (step 804). Next, an indication is received that a node in the tree view control has been selected (step 806). Typically, a user using an input device selects the node. For example, a user may use a pointing device, such as a mouse, to point to the node and then use an indicator, such as a mouse button, to identify the node. Then, an indication is received that the selected node has been "dragged" to the sub-tree bar control (step 808). Usually, dragging occurs when the user points at the node with a mouse, depresses the mouse button, and then moves the mouse to the sub-tree bar control. Finally, an indication is received that the node is "dropped" onto a button of the sub-tree bar control (step 812). That is, a user, who has selected a node in the tree and "dragged" the node over to the sub-tree bar control, positions the mouse over a button in the control and releases the mouse button. Next, the selected node is associated with the button (step 812), so that user selection of the button displays a sub-tree view control with the selected node as its root. After the association has been made, the sub-tree view control is populated with items (step 814). The sub-tree view control is a tree view control. However, unlike the tree view control, the sub-tree view control displays a sub-tree of the tree displayed in the tree view control. One skilled in the art would recognize that not all of the child nodes of the selected node that has been dropped onto a button need be displayed in the sub-tree view control, but a selected portion of these could be displayed. Being a tree view control, the sub-tree view control is a window that displays a list of items as a hierarchical sub-tree. The window has all the functionality of any window, and as such, the window can be resized.

That is, the drag and drop operation results in an association between the button and the node, which is the root node of a sub-tree view control. Each button of the sub-tree bar control can be associated with a different node. One skilled in the art would recognize that an operation other than the described drag and drop operation can be used to associate a button with a node. For example, a context menu can be provided that enables a user to select a node that will be the root node of a sub-tree view control. Moreover, a user can associate a new node with a button that already is associated with a node, thereby replacing the sub-tree in the sub-tree view control with a sub-tree whose root is the new node.

Figure 9:
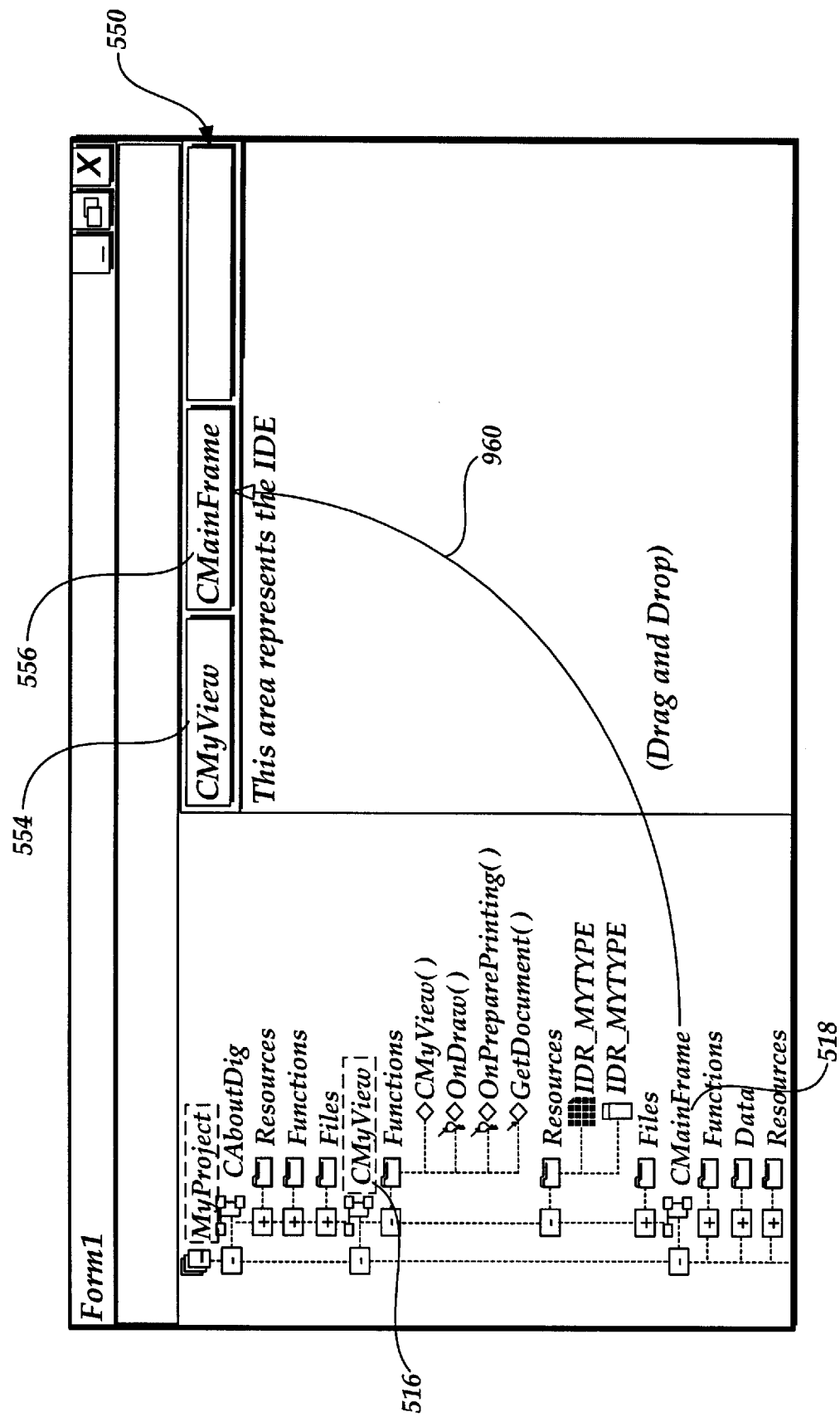
FIG. 9 illustrates a tree view control along with a sub-tree bar control in which the buttons are associated with nodes of different sub-tree view controls.

FIG. 9 illustrates a tree view control 510 along with a sub-tree bar control 550 in which the buttons are associated with nodes of different sub-tree view controls. For example, button 554 is associated with a sub-tree view control with a root node of "CMyView." As shown, the button has a label, "CMyView," which is the same label that the selected node has in the tree view control. One skilled in the art would recognize that the label of the button could differ from the label of the node in the tree. In addition, button 556 is associated with a sub-tree view control with a root node of "CMainFrame." As indicated by the arrow 960, a node in the tree of the tree view control is selected, dragged to a button on the sub-tree bar control, and dropped onto the button, whereby an associated is created between the button and the node.

When a user selects a button, the associated sub-tree view control is displayed. As discussed above, movements of the mouse are reflected in messages that are placed into the message queue of the application program. In particular, when a user positions a mouse cursor 604 over a window, the procedure of the window receives a mouse message. The operating system 610 provides a number of predefined mouse messages. The mouse messages specify the status of mouse buttons and the position of the mouse cursor within the screen of the video display. The position of the mouse cursor within the specified screen is specified in (X,Y) coordinates relative to the upper left-hand corner of the screen. When the mouse cursor moves within the sub-tree bar control, the position of the mouse cursor is adjusted to reflect the (X,Y) coordinates within the window relative to the upper left-hand corner of the window. The window procedure receives the mouse message and utilizes the information contained in the messages to respond to mouse activities. In particular, this enables dragging and dropping operations to create an association between a button and a root node of a sub-tree bar control. Furthermore, this enables selection of a button to display a sub-tree bar control.

Figure 10:
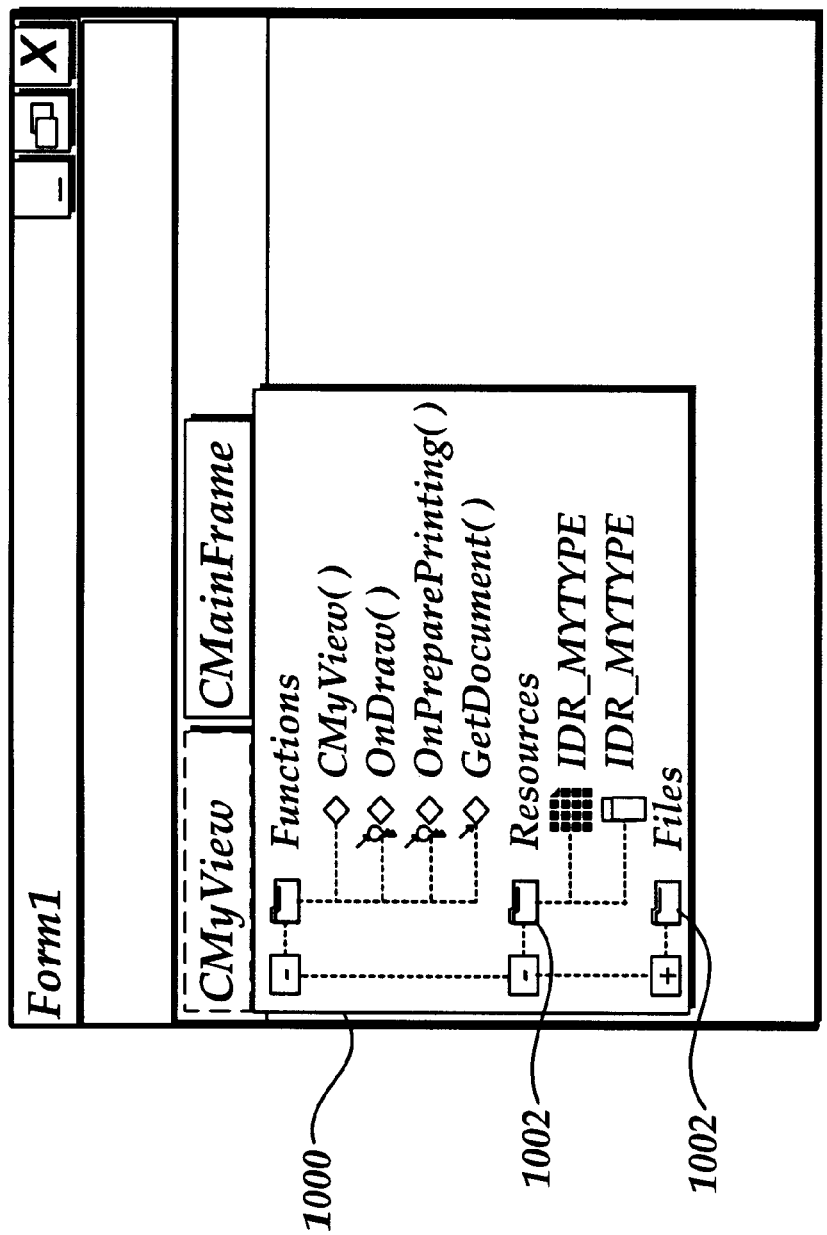
FIG. 10 illustrates a sub-tree view control.

FIG. 10 illustrates a sub-tree view control 1000. The sub-tree view control is typically displayed adjacent to the button associated with its root node on the sub-tree bar control. One skilled in the art would recognize that the sub-tree view control need not be displayed adjacent to the sub-tree bar control. The sub-tree in the sub-tree view control has all of the functionality of the tree in the tree view control. For example, nodes in the sub-tree can be expanded or contracted. The "Resources" node 1002 has been expanded, and the "Files" node 1004 has been contracted. Moreover, a node in the sub-tree can be selected and dragged and dropped onto a button, which results in another sub-tree view control being generated. Also, the display of the tree view control can be ceased. For example, in FIG. 10, the tree view control is not displayed, thereby additionally decreasing the amount of display space on the video display that is used by the controls.

Figure 11:
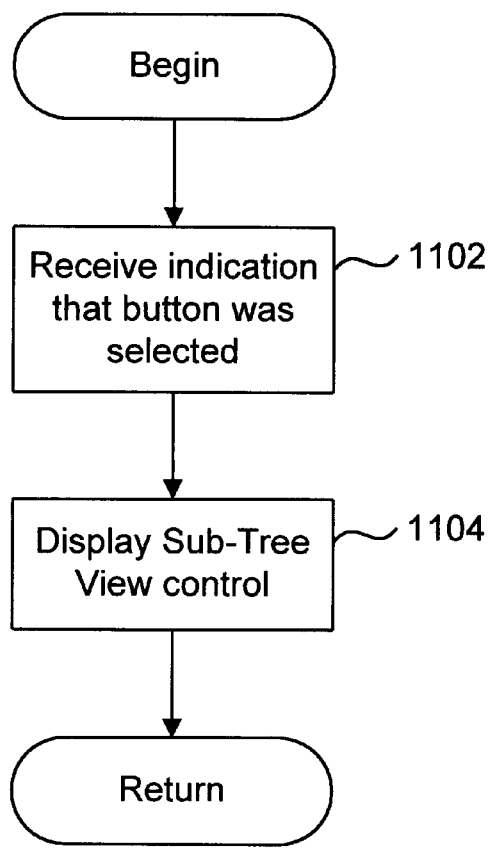
FIG. 11 illustrates the steps performed to display a sub-tree view control.

FIG. 11 illustrates the steps performed to display a sub-tree view control. An indication is received that a button has been selected (step 1102). The indication is typically a clicking of a mouse button on the button of the sub-tree control bar. Next, the sub-tree view control whose root node is associated with the button is displayed (step 1104). When a users clicks anywhere on the display other than the sub-tree view control or its' root node's associated button, the sub-tree view control is no longer displayed on the video display, thereby making display space available on the video display.

Figure 12:
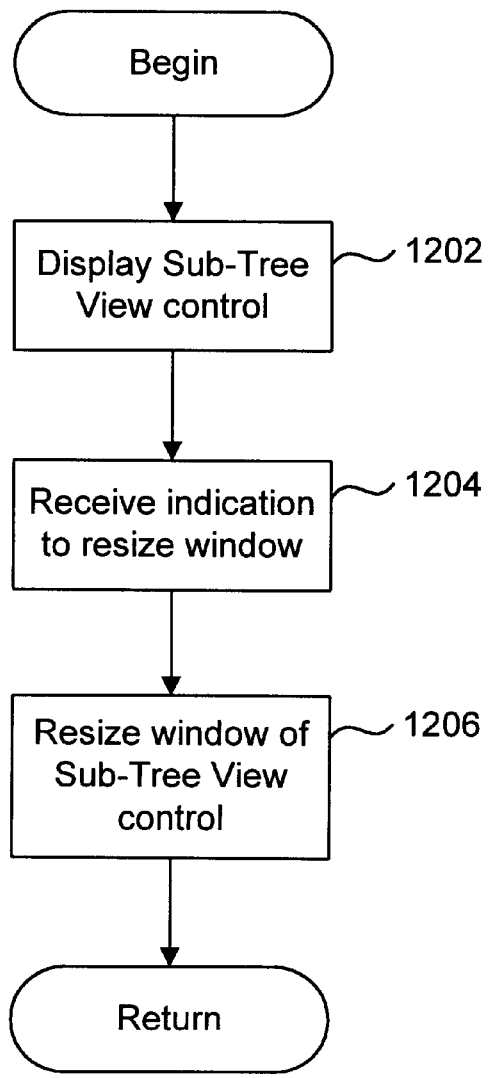
FIG. 12 illustrates the steps performed to resize a window of a sub-tree view control.

Each sub-tree view control is in a window which can be independently resized. FIG. 12 illustrates the steps performed to resize the window of the sub-tree view control. A sub-tree view control is displayed (step 1202). An indication is received to resize the window of the sub-tree view control (step 1204). Then, the window is resized (step 1206). For example, the width of a window, the height of the window, or both could be enlarged or reduced. Comparing the sub-tree view control 1000 of FIG. 10 with the tree view control 510 of FIG. 5, when a user desires to view a particular node, other than the root node of the tree view control, the sub-tree view control provides the user with a display of the node and its children while taking up a minimum amount of display space on the video display. Moreover, because the tree in the tree view control typically displays some nodes that the user is not interested in, the user using the tree in the tree view control could be distracted by unnecessary nodes. However, when a user uses a sub-tree view control, the user is not distracted in this manner.

Figure 13:
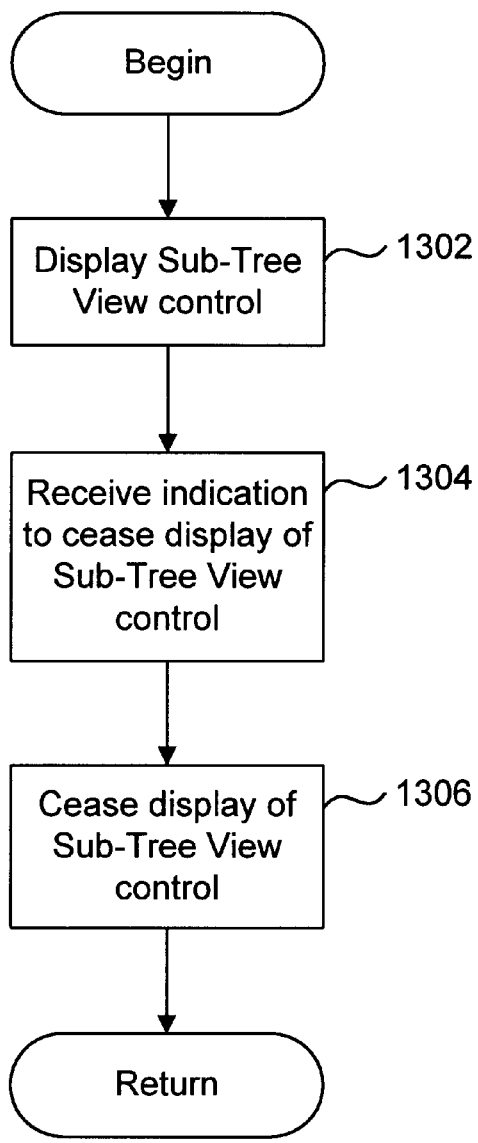
FIG. 13 illustrates the steps performed to cease the display of a sub-tree view control.

FIG. 13 illustrates the steps performed to cease the display of a sub-tree view control. Initially, a sub-tree view control is displayed (step 1302). An indication is received to stop displaying the sub-tree view control (step 1304). The indication can be either user selection of another button of the sub-tree bar control or a mouse click in a region other than the displayed sub-tree view control. Then, the sub-tree view control ceases to be displayed (step 1306).

Figure 14:
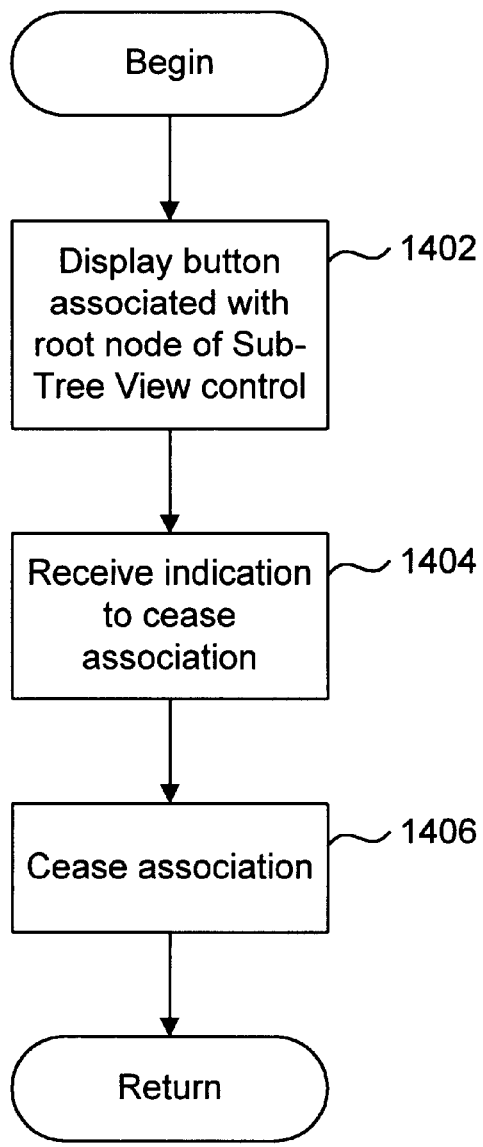
FIG. 14 illustrates the steps performed to cease the association of a node of a sub-tree from a user interface element of a sub-tree bar control.

FIG. 14 illustrates the steps performed to cease the association of (i.e., disassociate) a node of a sub-tree from a user interface element of a sub-tree bar control. Initially, a user interface element, such as a button, is displayed as part of a sub-tree bar control that is associated with a node that is the root node of a sub-tree view control (step 1402). An indication is received to cease the association of the button and the node (step 1404). To cease the association, the user typically "drags" the button off of the sub-tree bar control. That is, the user points at the button with a mouse, depresses the mouse button, and positions the mouse so that it is not on the sub-tree bar control. Upon releasing the mouse button, the button ceases to be associated with the node (step 1406). One skilled in the art would recognize that other indications may be received to disassociate the button and the node. For example, another indication arises when another node of the tree is dragged and dropped onto the button, thus associating the button with a new node that is the root node of a new sub-tree view control.

While the present invention has been described with reference to a preferred embodiment thereof, those skilled in the art will appreciate that various changes in form or detail may be made without departing from the intended scope of the present invention as defined in the claims. For example, changes to the hierarchy in the sub-tree view control can be reflected in the tree view control, and changes to the hierarchy of the tree view control can be reflected in the sub-tree view control.

I claim:

1. In a data processing system having a video display and an input device, a method for displaying a list of items, comprising:

(a) displaying a tree view control, the tree view control providing a display of a first list of items in a hierarchical tree;

(b) displaying a sub-tree bar control having at least one user interface element;

(c) selecting one of the items in the first list to be the root item for a second list;

(d) associating the selected one of the items in the first list with the user interface element of the sub-tree bar control, the user interface element being persistently associated with the selected item;

(e) automatically generating a sub-tree view control when the selected item in the first list is persistently associated with the user interface element, the sub-tree view control providing for a display of the second list of items in a hierarchical sub-tree that includes the selected one of the items in the first list as the root item; and (f) in response to selecting the user interface element of the sub-tree view control, displaying the generated sub-tree view control, so that the hierarchical sub-tree is separately displayable for use with an application program when the hierarchical tree is not displayed.

2. The method of claim 1, wherein associating the selected one of the items in the first list with the user interface element of the sub-tree bar control further comprises:

(a) dragging the selected one of the items to the user interface element of the sub-tree bar control; and (b) dropping the selected one of the items onto the user interface element, thereby creating a persistent association between the selected one of the items and the user interface element.

3. The method of claim 1, wherein the user interface element is a button.

4. The method of claim 1, wherein the user interface element is an icon.

5. The method of claim 1, wherein the user interface element is a window.

6. The method of claim 1, further comprising:

(a) selecting the display of the generated sub-tree view control; and (b) resizing the display of the generated sub-tree view control by dragging a portion of the display of the sub-tree view control from a position to another position.

7. The method of claim 1, wherein the generated sub-tree view control is a first sub-tree view control and wherein after displaying the generated sub-tree view control, further comprising:

(a) selecting one of the items in the second list displayed in the first sub-tree view control;
(b) associating the selected one of the items in the second list with another user interface element of the sub-tree bar control, the other user interface element being persistently associated with the selected item in the second list; and
(c) automatically generating a second sub-tree view control when the selected one of the items in the second list is persistently associated with the other user interface element, the second sub-tree view control providing for a display of a third list of items in another hierarchical sub-tree that includes the selected one of the items in the second list as another root item for the other hierarchical sub-tree; and
(d) in response to selecting the user interface element, displaying the generated second sub-tree view control, so that the other hierarchical sub-tree is separately displayable for use with the application program when the hierarchical tree is not displayed.

8. The method of claim 1, wherein after displaying the generated sub-tree view control, in response to indicating that the sub-tree view control is not to be displayed, ceasing to display the generated sub-tree view control.

9. The method of claim 8, wherein the user interface element is the first user interface element and wherein ceasing to display the generated sub-tree view control is in response to selecting another user interface element of the sub-tree bar control.

10. The method of claim 1, wherein after displaying the generated sub-tree view control, in response to disassociating the persistent association of the user interface element with the selected one of the items in the list, disassociating the generated sub-tree view control from the user interface element.

11. The method of claim 1, wherein the hierarchical sub-tree has at least two levels and wherein each of the items in the second list is a node that corresponds to a node in the tree, and wherein after displaying the generated sub-tree view control, in response to selecting an expansion indicator associated with a node in the hierarchical sub-tree, expanding the node associated with the selected expansion indicator.

12. The method of claim 1, wherein the hierarchical sub-tree has at least two levels and wherein each of the items in the second list is a node that corresponds to a node in the tree, and wherein after displaying the generated sub-tree view control, in response to selecting a contraction indicator associated with a node in the hierarchical sub-tree, contracting the node associated with the selected contraction indicator.

13. In a data processing system having a video display and an input device, a method for displaying a list of items, comprising:
(a) displaying a tree view control within a window, the tree view control providing a first list of items displayed as a hierarchical tree;
(b) displaying a sub-tree bar control having at least one user interface element; and
(c) selecting from the first list one of the items that is a root for a portion of the hierarchical tree;
(d) dragging the selected one of the items to the user interface element on the sub-tree bar control; and
(e) dropping the selected one of the items onto the user interface element, thereby creating a persistent association between the selected one of the items and the user interface element, whereby when the user interface element is selected, a sub-tree view control with the selected one of the items as a root is displayed, so that the hierarchical sub-tree is separately displayable for use with an application program when the hierarchical tree is not displayed.

14. The method of claim 13, further comprising displaying the portion of the hierarchical tree for which the selected one of the items is the root in another window.

15. In a data processing system having a video display and an input device, a method for displaying a list of items for use by an application program, comprising:
(a) displaying a sub-tree bar control having at least one user interface element that is persistently associated with a sub-tree view control that provides for the display of a portion of a list of items in a hierarchical sub-tree;
(b) in response to selecting the user interface element associated with the sub-tree view control, displaying the portion of the list of items in the hierarchical sub-tree for use with an application program, so that the portion of the list of items is separately displayable when the complete list of items is not displayed.

16. The method of claim 15, wherein the displayed sub-tree view control is a first sub-tree view control within a first window that provides a first list of items, and wherein, after displaying the first sub-tree view control, further comprising:
(a) selecting from the first list one of the items displayed by the first sub-tree view control;
(b) associating the selected one of the items from the first list with another user interface element of the sub-tree bar control, the user interface element being persistently associated with the selected item;
(c) automatically generating a second sub-tree view control that displays a second list of items as another hierarchical sub-tree when the selected one of the items from the first list is persistently associated with the other user interface element, the other hierarchical sub-tree including the selected one of the items from the first list as a root item for the other hierarchical sub-tree; and
(d) in response to selecting the other user interface element, displaying the generated second sub-tree view control within a second window, so that the second sub-tree view control will provide a separate display of the other hierarchical sub-tree when the tree view control is not displayed.

17. The method of claim 15, wherein after displaying a sub-tree view control, indicating that the sub-tree view control is not to be displayed, so that the sub-tree view control ceases to be displayed for use with the application program.

18. The method of claim 17, wherein the user interface element is the first user interface element, and wherein ceasing to display the generated sub-tree view control occurs when another user-interface element is selected.

19. The method of claim 15, wherein after displaying the sub-tree view control, in response to indicating that the sub-tree view control is to be disassociated from the user interface element, causing the persistent association of the sub-tree view control with the user interface element to be disassociated.

20. The method of claim 19, wherein disassociating the sub-tree view control from the user interface element further comprises:

(a) selecting the user interface element of the sub-tree bar control; and (b) dragging the selected user interface element off of the sub-tree bar control.

21. The method of claim 15, wherein displaying the sub-tree view control associated with the selected user interface element causes the display of the sub-tree view control to be disposed adjacent to the sub-tree bar control.

22. In a data processing system having an application program, a video display, and an input device, a method for displaying a list of items, comprising:

(a) providing a sub-tree bar control having at least one user interface element associated with a sub-tree view control that is used by the application program to display a portion of the list of items as a hierarchical sub-tree, the sub-tree view control being automatically generated when the user interface element of the sub-tree bar control is persistently associated with one item selected from the list of items to be a root for the hierarchical sub-tree; and (b) using the sub-tree bar control to display the sub-tree view control associated with the user interface element, so that the sub-tree view control will provide a separate display of the portion of the list of items as the hierarchical sub-tree when another view control that displays the entire list of items as a hierarchical tree is not displayed.

23. In a data processing system having a client application program, a server application program, a video display, and an input device, a method for displaying a list of items, comprising:

(a) under control of the server application program, providing a sub-tree bar control having at least one user interface element associated with a sub-tree view control that is used by the application program to display a portion of a list of items as a hierarchical sub-tree;

(b) under control of the client application program, comprising:

(i) displaying the sub-tree bar control provided by the server application program; and (ii) automatically populating the hierarchical sub-tree with the portion of the list of items when a user interface element is persistently associated with one item selected from the list of items as a root item for the portion of the list of items; and (c) under control of the server application program, in response to selecting the user interface element, displaying the sub-tree view control, so that the sub-tree view control will provide a separate display of the portion of the list of items as the hierarchical sub-tree when another view control that displays the entire list of items as a hierarchical tree is not displayed.

24. A data processing system, comprising:

(a) a video display;

(b) an input device;

(c) a first displayor for displaying on the video display a tree view control within a first window, the tree view control providing a first list of items displayed as a hierarchical tree;

(d) a second displayor for displaying on the video display a sub-tree bar control having at least one user interface element;

(e) a selector for, in response to input from the input device selecting one of the items in the first list, selecting one of the items in the first list to be a root item for a second list of items;

(f) an associator for persistently associating the selected one of the items in the first list with the user interface element of the sub-tree bar control;

(g) a generator for automatically generating a sub-tree view control when the selected item is persistently associated with the user interface element of the sub-tree bar control, the sub-tree view control providing a display of the second list of items as a hierarchical sub-tree with the persistently associated one of the items in the first list being the root item of the second list of items in the hierarchical sub-tree; and (h) a third displayor for separately displaying on the video display the generated sub-tree view control within a second window, so that the hierarchical sub-tree is separately displayable when the first displayor is not displaying the tree view control for the first list of items.

25. The system of claim 24, wherein the associator persistently associates the selected one of the items in the first list with a user interface element of the sub-tree bar control when the selected one of the items in the first list is dragged to the user interface element and dropped on the user interface element.

26. The system of claim 24, further comprising a resizer for resizing the second window in response to an input from the input device indicating that the second window is to be resized.

27. The system of claim 24, further comprising a removal system for ceasing the display of the sub-tree view control and the second-window in response to input from the input device indicating that the sub-tree view control is not to be displayed in the video display.

28. The system of claim 24, further comprising an updator for updating the displayed sub-tree view control to reflect changes to the list of items displayed in the hierarchical tree by the tree view control.

29. A computer-readable storage medium having computer executable instructions for performing steps, comprising:

(a) displaying a tree view control within a first window, the tree view control providing a first list of items displayed as a hierarchical tree;

(b) displaying a sub-tree bar control having at least one user interface element;

(c) in response to selecting one of the items in the first list, selecting one of the items in the first list to be a root item for a second list of items;

(d) associating the selected one of the items in the first list with the user interface element of the sub-tree bar control, the user interface element being persistently associated with the selected item;

(e) automatically generating a sub-tree view control when the selected item is persistently associated with the user interface element of the sub-tree bar control, the sub-tree view control providing a display of the second list of items as a hierarchical sub-tree with the persistently associated one of the items in the first list being the root item of the second list of items in the hierarchical sub-tree; and (f) displaying on the video display the generated sub-tree view control within a second window, so that the hierarchical sub-tree is separately displayable when the first displayor is not displaying the tree view control for the first list of items.

30. The computer-readable storage medium of claim 29, having computer executable instructions for performing steps, further comprises resizing the second window in response to an input indicating that the second window is to be resized.

31. A method of customizing the display of a hierarchical sub-tree of items for use with an application program, comprising:

(a) displaying a hierarchical tree of items;

(b) displaying a sub-tree bar control having at least one user interface element;

(c) selecting one item in the hierarchical tree of items to be a root for the hierarchical sub-tree of items;

(d) associating the selected item in the hierarchical tree of items with the user interface element of the sub-tree bar control, the selected item being persistently associated with the user interface element and a sub-tree view control being automatically generated when the selected item in the hierarchical tree of items is persistently associated with the user interface element of the sub-tree bar control, the sub-tree view control providing for the display of the hierarchical sub-tree of items with the selected item as the root; and (e) in response to selecting the user interface element of the sub-tree bar control, causing the sub-tree view control to display the hierarchical sub-tree of items, so that the hierarchical sub-tree of items is separately displayable when the hierarchical tree of items is not displayed.

* * * * *

UNITED STATES PATENT AND TRADEMARK OFFICE
CERTIFICATE OF CORRECTION

Page 1 of 2

PATENT NO. : 5,923,328
DATED : July 13, 1999
INVENTOR(S) : J.P. Griesmer

It is certified that error appears in the above-identified patent and that said Letters Patent is hereby corrected as shown below:

On the title page:

| [56] Refs. Cited Pg. 1, col. 2 | (Other Publs., | ""Masterin" should read --"Mastering-- |
|---|---|---|
| Colunn | Line | |
| 2 | 62 | "sub-ree." should read --sub-tree.-- |
| 4 | 52 | "ode" should read --node-- |
| 6 | 66 | "CreateWindowEx( )" should read --CreateWindowEx()-- |
| 8 | 41 | "associated" should read --association-- |
| 8 | 58 | "comer" should read --corner-- |
| 9 | 21 | "users clicks" should read --user clicks-- |
| 9 | 22 | "its'" should read --its-- |
| 11 (Claim 7, line 11) | 7 | After "list;" delete "and" |

UNITED STATES PATENT AND TRADEMARK OFFICE
CERTIFICATE OF CORRECTION

PATENT NO. : 5,923,328
DATED : July 13, 1999
INVENTOR(S) : J.P. Griesmer

It is certified that error appears in the above-identified patent and that said Letters Patent is hereby corrected as shown below:

| COLUMN | LINE | |
|---|---|---|
| 11 | 33 | Before "list," insert --first-- |
| (Claim 10, | line 4) | |

Signed and Sealed this

Thirteenth Day of June, 2000

Attest:

Q. TODD DICKINSON

Attesting Officer           Director of Patents and Trademarks